(12) United States Patent
Becker

(10) Patent No.: US 8,233,663 B2
(45) Date of Patent: Jul. 31, 2012

(54) METHOD FOR OBJECT FORMATION

(75) Inventor: Jan-Carsten Becker, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 604 days.

(21) Appl. No.: 12/518,666

(22) PCT Filed: Feb. 7, 2008

(86) PCT No.: PCT/EP2008/051493
§ 371 (c)(1),
(2), (4) Date: Jun. 11, 2009

(87) PCT Pub. No.: WO2008/110416
PCT Pub. Date: Sep. 18, 2008

(65) Prior Publication Data
US 2009/0303234 A1 Dec. 10, 2009

(30) Foreign Application Priority Data

Mar. 15, 2007 (DE) .......................... 10 2007 012 458

(51) Int. Cl.
*G06K 9/00* (2006.01)
*G06K 9/34* (2006.01)
(52) U.S. Cl. .......................... 382/104; 382/103; 382/173
(58) Field of Classification Search .................. 382/103, 382/104, 173
See application file for complete search history.

(56) References Cited

U.S. PATENT DOCUMENTS

| | | | | |
|---|---|---|---|---|
| 5,706,355 | A | * | 1/1998 | Raboisson et al. ............ 382/104 |
| 5,949,905 | A | * | 9/1999 | Nichani et al. ................ 382/173 |
| 6,163,252 | A | | 12/2000 | Nishiwaki |
| 6,239,740 | B1 | | 5/2001 | Collins et al. |
| 6,801,662 | B1 | * | 10/2004 | Owechko et al. ............. 382/224 |
| 7,027,615 | B2 | * | 4/2006 | Chen ............................. 382/104 |
| 2002/0126891 | A1 | * | 9/2002 | Osberger ...................... 382/165 |
| 2004/0117090 | A1 | | 6/2004 | Samukawa et al. |
| 2005/0201591 | A1 | * | 9/2005 | Kiselewich ................... 382/104 |
| 2006/0023917 | A1 | | 2/2006 | Dickmann et al. |

FOREIGN PATENT DOCUMENTS

| | | |
|---|---|---|
| DE | 10 2004 007 553 | 9/2005 |
| DE | 10 2004 032 118 | 1/2006 |
| DE | 10 2004 039 095 | 2/2006 |
| EP | 1 085 456 | 3/2001 |
| EP | 1 672 390 | 6/2006 |

* cited by examiner

*Primary Examiner* — John Strege
(74) *Attorney, Agent, or Firm* — Michael J. Striker

(57) ABSTRACT

The invention relates to a method for object formation for environmental modeling, wherein the processing of information of a sensor is carried out in consideration of a segmenting threshold (62) that is non-linear at least in sections. The invention further relates to a device for object formation for environmental modeling, and to a computer program, and a computer program product.

10 Claims, 8 Drawing Sheets

METHOD FOR OBJECT FORMATION

The present invention relates to a method for object formation for environmental modeling, a device for carrying out object formation for environmental modeling, a computer program, and a computer program product.

BACKGROUND INFORMATION

Methods for processing sensor signals for systems for use by robots to detect surroundings have been known for a long time from the field of computer science and robotics. According to these methods, a sensor detection range of interest is subdivided into a specified number of fields. A probability value is determined for each field, as a measure of the presence of an obstacle in the particular field. These methods are referred to as "occupancy grids", "belief grids", or "evidence grids". Accordingly, procedures of this type form a potential basis for grid-based sensor signal processing and sensor data fusion.

It is provided in DE 10 2004 007 553 A1 that a motor vehicle's surroundings be subdivided into discrete fields to enable a motor vehicle safety system to detect its surroundings. The probability value of each field is compared with a specified probability threshold value. If the probability value of the field is greater than the specified probability threshold value, it is possible to deduce the presence of an obstacle in this field and, therefore, in the vehicle's surroundings.

A grid-based method of object detection is made known in DE 10 2004 032 118 A1. In that case, a vehicle's surroundings are detected by a sensor in a cyclic manner. Values measured by the sensor are projected into a freely specifiable grid, and they are combined to form grid-based segments which may be allocated to known objects. Moreover, "tracks" for these objects are determined, which may be used to control motor vehicle functions. In this method, it is provided that the increments of the cells in the grid differ and are shaped in the radial and/or circumferential direction in a manner such that an object resolution may be obtained that is optimized in terms of functionality.

DE 10 2004 039 095 A1 describes a system for detecting pedestrians using a sensor for detecting the surroundings. The sensor data are allocated to one another in a grid using the "grid of evidence" method.

The processing and fusion of data obtained via sensors for the reliable detection of objects using a grid-based method is known from EP 1 672 390 A1. It is provided, e.g., that first data are provided by a radar sensor, and second data are provided by a lidar sensor.

DISCLOSURE OF THE INVENTION

The method according to the present invention is provided for object formation for environmental modeling, in which case information received from a sensor is handled with consideration for a segmenting threshold which is non-linear, at least in sections.

The segmenting threshold which is non-linear, at least in sections, is used when designed as an angle-measuring device to determine whether an object is present in a region of the surroundings, and, therefore, in the surroundings of the sensor. This may be carried out, e.g., by comparing a value that is provided by the sensor as information with the non-linear segmenting threshold. It is typically assumed that the surroundings that are detected by the sensor correspond to a detection range of the sensor. A sensor that is used to carry out the method typically investigates the surroundings using electromagnetic waves. This sensor may detect, e.g., reflections of an object, measure them, and provide the information. Information of this type may be at least the value or a probability value that indicates within which quantitative and/or qualitative scope an object is present based on the reflections from a position of the surroundings that were detected. In order to interpret the value further, and, therefore, to use it for further applications or functionalities, it is provided in one embodiment that the value be compared with the segmenting threshold which is non-linear at least in sections, and to therefore make a possible claim regarding the presence of at least one object in the surroundings. This segmenting threshold may be non-linear in at least one direction, which may mean, e.g., that the segmenting threshold is non-linear laterally, and, therefore, in the lateral direction and/or longitudinally, i.e. in the longitudinal direction.

In one embodiment, the fact that the segmenting threshold is non-linear, at least in sections, may mean that it includes at least one non-linear section or region, and that further regions of this at least one segmenting threshold may also be linear. This also includes the possibility that the at least one segmenting threshold is non-linear across an entire range. The segmenting threshold which is non-linear at least in sections may also be composed of at least one segmenting threshold or sub-segmenting threshold, wherein the at least one sub-segmenting threshold is non-linear, at least in sections.

In a further embodiment of the present invention, different implementations or designs may be provided for the segmenting threshold, based on which further variants of the information handling may be carried out. It is therefore possible, e.g., to implement the at least one segmenting threshold in a manner that is a functionally adaptive and, therefore, functionally adjusted. In this case, the at least one segmenting threshold is determined in a quantitative and/or qualitative manner in a manner such that the information obtained via the sensor is particularly well-suited for use for a certain function. If it should be provided that various functionalities should be provided with information at one point in time, several segmenting thresholds that are adapted to the functionalities in an individualized manner may be used simultaneously. It is therefore possible to implement the non-linear segmenting threshold with consideration for a function, and to thereby optimize it in a functionally-specific manner.

As an alternative or in addition thereto, it may also be provided that the at least one segmenting threshold is implemented in a manner such that it is based on a characteristic curve, is adapted to the situation, and/or is based on a model. It may also be provided that the object formation is regularly carried out in a cell grid-based manner. This may mean that the environment to be modeled is distributed throughout cells of a two- or three-dimensional grid. In one embodiment of the present invention, at least one section of the non-linear segmenting threshold may be allocated to each cell of a grid of this type, as a function of a quantity of the cells and, therefore, as a function of a resolution of the grid. The non-linear segmenting threshold which is based on a characteristic curve may also be modified adaptively, e.g. within a locally limited range.

Using the method, it is also possible to process a sensor signal. It may be provided that a sensor signal transmits at least one piece of information from the sensor. As an alternative or in addition thereto, the method may also be used to perform sensor data fusion. In this case, the data obtained via the sensor may include, e.g. sensor information that was obtained via measurements.

In one application, the method may be implemented for a driver assistance system. Driver assistance systems of this type may be designed as components of vehicles, in particular motor vehicles. It is possible, e.g., to model a vehicle's surroundings and, therefore, a traffic situation in which the vehicle is present, based on detection carried out using sensors.

By using a segmenting threshold which is non-linear at least in sections, the traffic situation may be detected in a suitable manner such that, by arranging the information, certain regions of the vehicle's surroundings may be handled in a more or less relevant manner.

The device according to the present invention is designed to carry out object formation for environmental modeling. This device includes at least one module which is designed to handle information received from a sensor with consideration for a segmenting threshold which is non-linear, at least in sections.

The at least one module may also be designed to implement at least one step of the method described above. This at least one module may also be designed, e.g., as a computer or a related arithmetic unit.

The present invention also relates to a computer program that includes program code means for carrying out all steps of a method described above when the computer program is run on a computer or a related arithmetic unit, in particular in device according to the present invention.

The computer program product which is also provided according to the present invention and which includes program code means which are stored on a computer-readable data storage device is designed to carry out all steps of a method according to the present invention when the computer program is run on a computer or a related arithmetic unit, in particular on a device according to the present invention and as described above.

The method is used, e.g., to perform object formation for a cell grid-based method or environmental modeling to perform sensor-signal processing and sensor-data fusion or multisensor data fusion, e.g., for use in active driver assistance systems or vehicle safety systems. Using object formation, it is possible to determine where an object is located in a vehicle's surroundings. Kinematic quantities of the object in addition to a position, e.g., speed and acceleration, may be determined, thereby also making it possible to detect the surroundings.

The method may be used to process raw data obtained via sensors, and to perform sensor data fusion in vehicle environmental modeling. In addition or as an alternative thereto, the method may also be used in sensor-signal processing and multisensor data fusion for active vehicle safety systems.

In one embodiment of the present invention, it is provided that at least one non-linear segmenting threshold for cell grid-based procedures for sensor-signal processing and sensor-data fusion for driver assistance systems is implemented in a functionally adaptive manner. It is therefore possible to generate objects in a manner that is optimized for a specific function by assigning a function-specific characteristic curve or a two- or three-dimensional characteristic surface and/or a model of a general, universal description of surroundings. The segmenting threshold may be adapted and/or specified with regard for a functionality of the vehicle.

In the grid-based design, the method may be used, e.g., to model the surroundings that are relevant and detectable. For this purpose, the surroundings are subdivided into a number of cells, and are thereby subdivided into discrete units. For each cell, the probability that this cell is occupied or not occupied is calculated. By taking a probability description into account, it is possible to use the method, e.g., to plan a route in a predicting manner.

In an optional cell grid-based implementation of the method, a universal, functionally-non-specific description of the surroundings may be provided in order to perform sensor data fusion using probability distributions for the occupancy of cells in the cell grid. The object formation may take place by classifying the cells as being occupied or not. In a further application, different intersection levels are used for different functions, e.g., for comfort and/or safety functions.

In one embodiment, a functionality to which the object formation must be adapted may typically place different requirements on the object formation. This is dependent on where the potential object is located in the detection range or active range of the functionality. In a suitable implementation, depending on the design, it is possible to avoid undesired or missing objects, thereby eliminating the need to perform additional tasks due to filtering or poor functional behavior.

In one embodiment of the present invention, it is possible to use, in addition to a constant or linear segmenting threshold, a non-linear segmenting threshold in particular that is adapted to the particular functionality, and that may be based on a characteristic curve. As an alternative or in addition thereto, the segmenting threshold may be implemented in a manner that is adapted to the situation and is based on a model.

In one example of the non-linear segmenting threshold that is adapted to a particular functionality, it is provided that a functionality concentrates on the active region directly ahead of the vehicle, in the longitudinal direction. It may be provided that objects that have great lateral displacement are referred to the functionality only if they absolutely must be detected.

When the vehicle is traveling straight ahead, it is necessary, e.g., for objects that are situated in front of the vehicle to be of particular significance, and for their distance away to be taken into account. In one embodiment, objects that are located to the left or right are typically taken into consideration to a lesser extent when the vehicle is traveling straight ahead.

In comparison with a constant segmenting threshold, it is possible to select the segmenting threshold such that it is non-linear, at least in sections. As a rule, any other laterally non-linear threshold or segmenting threshold is also possible. It is also feasible to implement a threshold that is non-linear in the longitudinal direction, and that is therefore longitudinally non-linear, when certain functionally specific requirements apply. As an alternative, it is also possible in this case to use any other threshold that is longitudinally non-linear. It is also possible to combine a longitudinally non-linear threshold with a laterally non-linear threshold. In all, the non-linear segmenting threshold may be composed of several segmenting thresholds or sub-segmenting thresholds, wherein the at least one segmenting threshold and, therefore sub-segmenting threshold, is non-linear, at least in sections or regions.

In one application of the method, the sensor is used to detect, e.g., the back sides of vehicles that are traveling directly ahead. In this case, it is often possible for reflections on axles or other vehicle components located further forward to also be detected. In this case, experience has shown that it is difficult to determine whether these components belong to the rear end of the vehicle, or if they are independent objects. This problem may be eliminated by selecting the non-linear segmenting threshold in a suitable manner.

In one example, a functionality is provided that is designed to react primarily to objects that are traveling directly ahead. For this functionality, the method may be used to adaptively modify a segmenting threshold—within a locally limited range—that is typically based on a characteristic curve. For this purpose, the non-linear segmenting threshold is raised or increased in an adaptive, model-based method after the first detection is made in the longitudinal direction, in order to reduce the number of subsequent detections on the same vehicle.

According to a further embodiment of the present invention, it is provided that the entire width, if possible, of the back side of a vehicle traveling directly ahead is detected. Experience has shown that strong detections occur on the closest edge of the vehicle, e.g., on the license plate. To prevent erroneous detections from occurring, the non-linear segmenting threshold is typically set at a high level, and is therefore not selected too low. In order to ensure that the entire width of the vehicle is detected, if possible, in addition to strong detection, the non-linear segmenting threshold is also lowered in an adaptive manner in a range that is described via a model, to ensure that weaker detections are still carried out in this range.

The method according to the present invention may be combined or supplemented with further methods for sensor-signal processing and/or sensor data fusion. Within the framework of a first method of this type, a sensor-signal processing that takes place internal to radar may be used to process radar spectra for radar detection. In this case, the detection of an object may be carried out by processing information that is present as sensor data, within the framework of grid-based, probabilistic sensor data fusion. Using the sensor data, probabilities of occupancy for cells in a spacial grid are determined, and one coherent region composed of occupied cells is determined via segmenting. The object may be detected based on this region.

According to a second procedure that may be combined with the method, different object hypotheses are generated for comfort and safety functions in driver assistance systems that utilize cell grid-based environmental modeling. In one application, several different, functionally-specific, non-linear segmenting threshold values may be determined as a function of different requirements on the object hypothesis for various driver assistance systems.

The method may also be combined with a third procedure in order to jointly process and fuse data obtained in the detection of an object or feature. In this procedure, a free-form detection is carried out using cell grid-based environmental modeling, e.g., for driver assistance systems, and, in particular, for predictive safety systems. In this case, in order to detect the surroundings, it may be provided that data used to detect objects in the surroundings are processed jointly with data used to detect open spaces in the surroundings. It is also possible in this context to provide a probability that at least one region in the surroundings is open.

In a further application, the method may be used, with consideration for information related to obstacles and driveability, in an assistance system for motor vehicles in order to avoid accidents via evasion. To prevent accidents, obstacle and driveability information may be depicted in a cell grid. This makes it possible, e.g., to control a vehicle automatically, in which case information about at least one surface that may be traversed by the vehicle is taken into account in order to provide an evasive trajectory for the vehicle before it reaches the obstacle.

It may also be provided that the method is used in driver assistance systems to detect open spaces during object detection in the process of perceiving the surroundings, it also being possible to describe the surroundings in a cell grid-based manner. A variant of the method of this type may be used to favorably implement cell grid-based environmental modeling for sensor-signal processing and sensor data fusion. Much less memory and computing power is required for this variant as compared to conventional methods. In this procedure for processing sensor signals in a grid-based manner, at least one cell of a grid is allocated to a field of a basis that is defined using at least one first kinematic quantity. At least one value for at least one second kinematic quantity that is derived from at least one sensor signal may be attached to the cell.

In order to use the functionalities that are present and that are based on the object description in a cell grid-based procedure, "object formation" or segmenting may be carried out as the intermediate step. This typically includes a classification of individual cells as being occupied or not, which may be carried out by finding regions of connected, occupied cells and by utilizing a compact description of the connected cell regions as objects.

The method may be used in the field of driver assistance systems to expand established functionalities which are typically based on the object concept. The sensor system used to perceive the surroundings typically detects detectable objects located in the vehicle's surroundings, and it describes them using a closed data record, e.g., based on position and further kinematic quantities such as speed and acceleration, and, possibly, based on object dimensions and uncertainties of measurement. This data record is typically referred to as an object. This results in a compact descriptive form that includes consideration for a strong abstraction of the raw measurement carried out by the sensor to the object in the sensor, in one step.

To generate an object, occupied cell regions, e.g., connected regions of occupied cells, may be found and linked to form objects. Although a picture, in the actual sense, does not exist, the cell region may be interpreted as a digitized image. In this case, every cell is considered to be a pixel, the gray value of which is given by the probability measure of the cell. Locating connected cells, i.e., connected image regions, therefore corresponds to segmenting in the sense of image processing.

In one embodiment of the method, individual cells are classified as being occupied or not, e.g., by calculating a threshold value. A field having the highest probability value may be identified. If this probability value is greater than a defined, non-linear probability threshold value that is functionally adaptive in particular, and that is typically based on the non-linear segmenting threshold, it is possible to deduce that an object or obstacle is present in the vehicle's surroundings.

In order to also detect objects located further away, the non-linear segmenting threshold value or the non-linear segmenting threshold may be implemented as a function of distance, in which case a lower segmenting threshold value is used for cells that are situated further away. More remote detections usually result in a lower back-scattering amplitude, which, in turn, results from a lower probability measure for the state of occupancy of more remote cells compared with cells that are closer.

In a further application, several different, functionally-specific, non-linear segmenting thresholds may be used, in which case they are determined as a function of different requirements on the object hypothesis for various driver assistance systems, e.g., comfort and safety systems.

Based on a defined segmenting threshold or threshold $\epsilon$, a cell is classified according to its probability measure as being occupied when $P \geqq \epsilon$, or as being unoccupied when $P < \epsilon$. Typically, only those cells that are classified as being occupied are used in the object formation. Values for the non-linear segmenting threshold may be determined by making a suitable selection or definition of the quantity of all E.

Furthermore, the "region-growing" algorithm may be used within the framework of the method in order to find regions of connected cells. The cell region is investigated systematically, by rows and columns. A first cell that fulfills the threshold value criterium $P \geq \epsilon$ is typically used as a germ cell. Next, a search is carried out for all cells that are connected to this cell and for which $P \geq \epsilon$ applies. Adjacent cells that are found are used, in turn, as germ cells. The process is repeated until all of the cells that are connected to the germ cell have been identified. They are typically allocated to an object. Next, the cell region is investigated further until a further germ cell is found, or until all cells in the cell region have been investigated.

To describe connected regions, it is also possible to investigate circumscribing, axially parallel rectangles, circumscribing, minimal surface area rectangles, circumscribing, oriented rectangles, and convex sleeves as the descriptive shape of interconnected cell regions. The description based on convex sleeves may contain all essential information and be easily compressed further. In one embodiment, the decision to use the convex sleeve or a simpler descriptive form is dependent on the requirements of the subsequent application, thereby typically enabling the object description to be carried out in a functionally specific manner.

Further advantages and embodiments of the present invention result from the description and the attached drawing.

It is understood that the features that mentioned above and that are described below may be used not only in the combination described, but also in other combinations or alone, without leaving the scope of the present invention.

Figure 1:
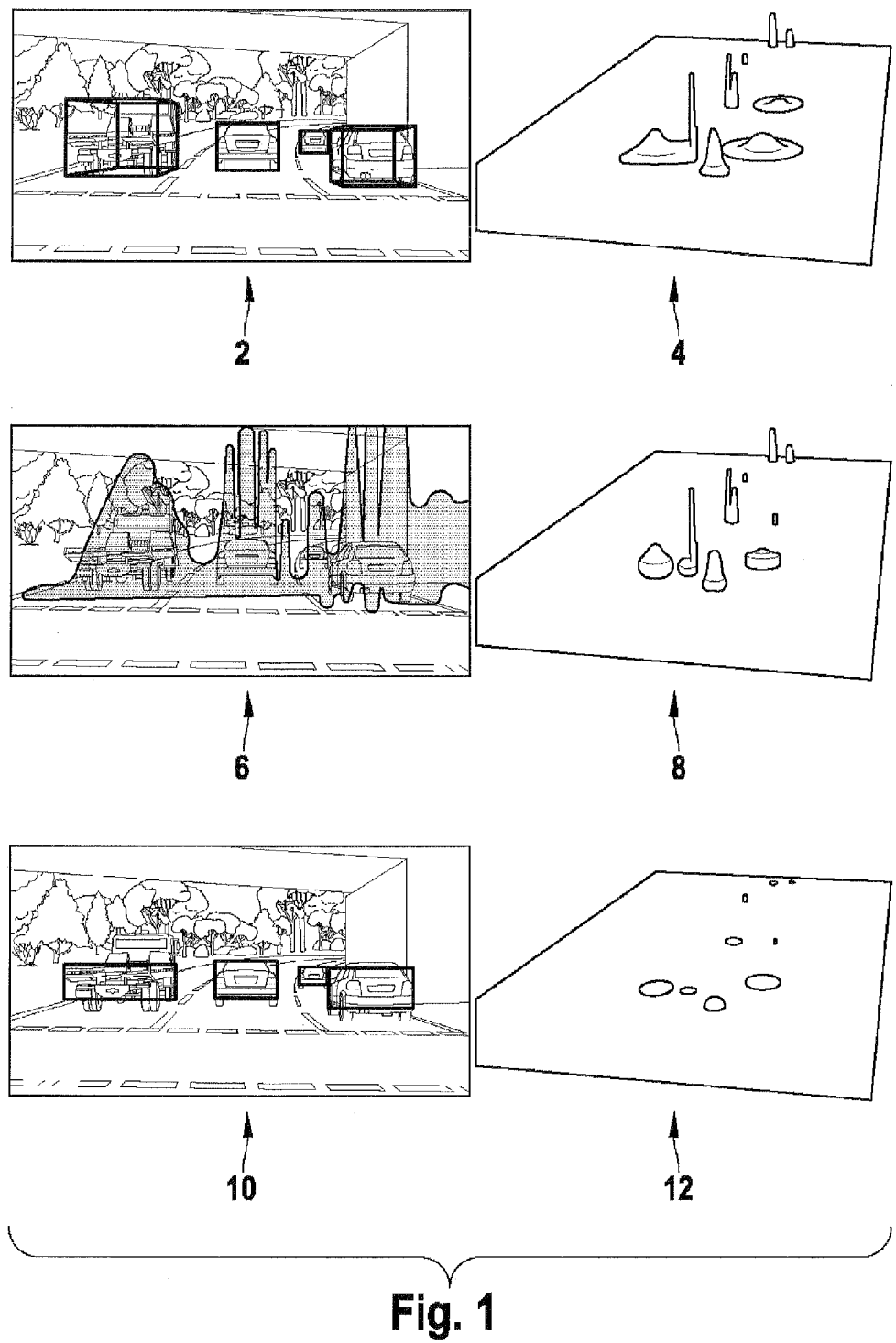
FIG. 1 shows a schematic depiction of an embodiment of the steps involved in a grid-based method for sensor-signal processing and sensor-data fusion.

The present invention is depicted schematically with reference to exemplary embodiments in the drawings, and it is described in detail below with reference to the drawings.

Embodiments of the Invention

FIG. 1 shows a schematic depiction of an example of the steps involved in a grid-based method for sensor-signal processing. The intention in this case is to detect a traffic situation as an environment to be modeled. FIG. 1 shows sensor objects in a first illustration 2, environmental modeling in a first diagram 4, a probability distribution in a second illustration 6, a depiction of cells after forming sections within the environmental modeling, in a second diagram 8, the resultant SDF objects in a third illustration 10, and the resultant cell regions within the environmental modeling, in a third diagram 12. Illustrations 2, 6, 10 depict the same traffic situation. In first illustration 2, vehicles that are detected by a sensor as being objects are enclosed in cuboids. Based thereon, a first diagram 4 is created, in which the resultant environmental modeling is plotted. Based thereon, and as shown in second illustration 6, a probability distribution is allocated to each object in the traffic situation. As the process continues, values for the cells are shown in second diagram 8, after section formation. This information is used to assign rectangles to the objects in third illustration 10, thereby enabling the individual objects to be identified as resultant SDF objects. This information is used to create third diagram 12, in which occupied cells in which an object is therefore present are characterized unambiguously.

Figure 2A:
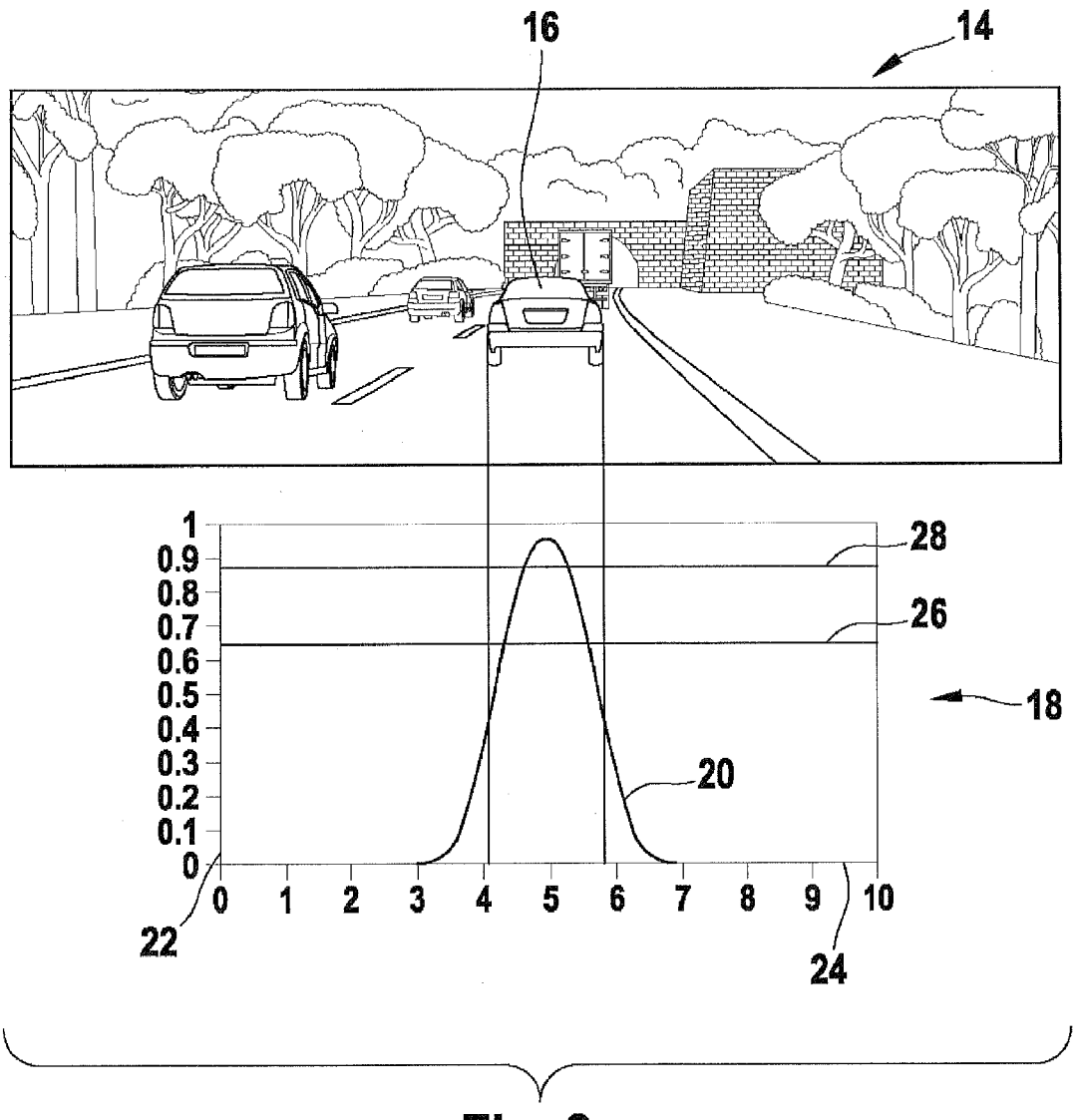
FIG. 2 shows examples for using a function-dependent segmenting threshold.
Figure 2B:
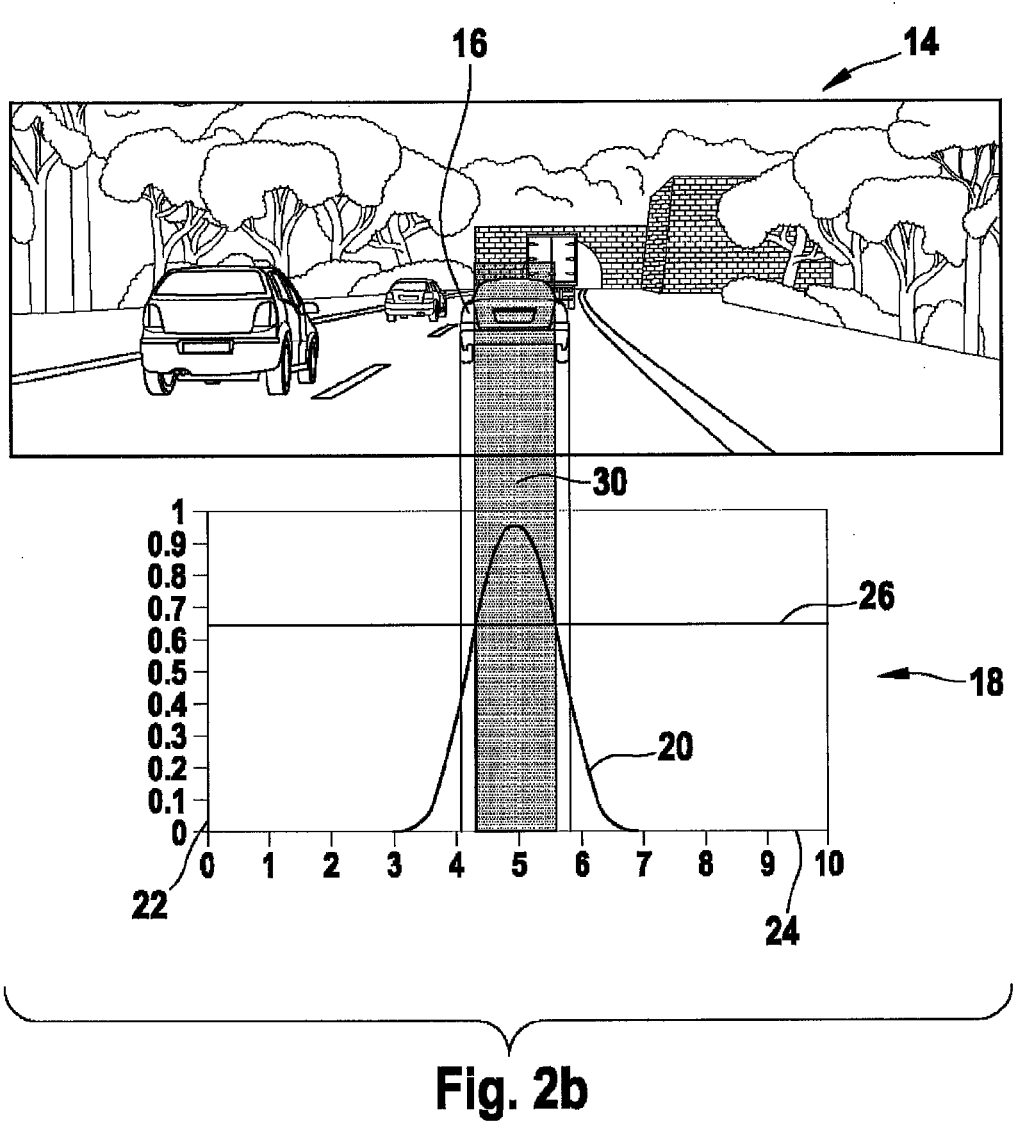
Figure 2C:
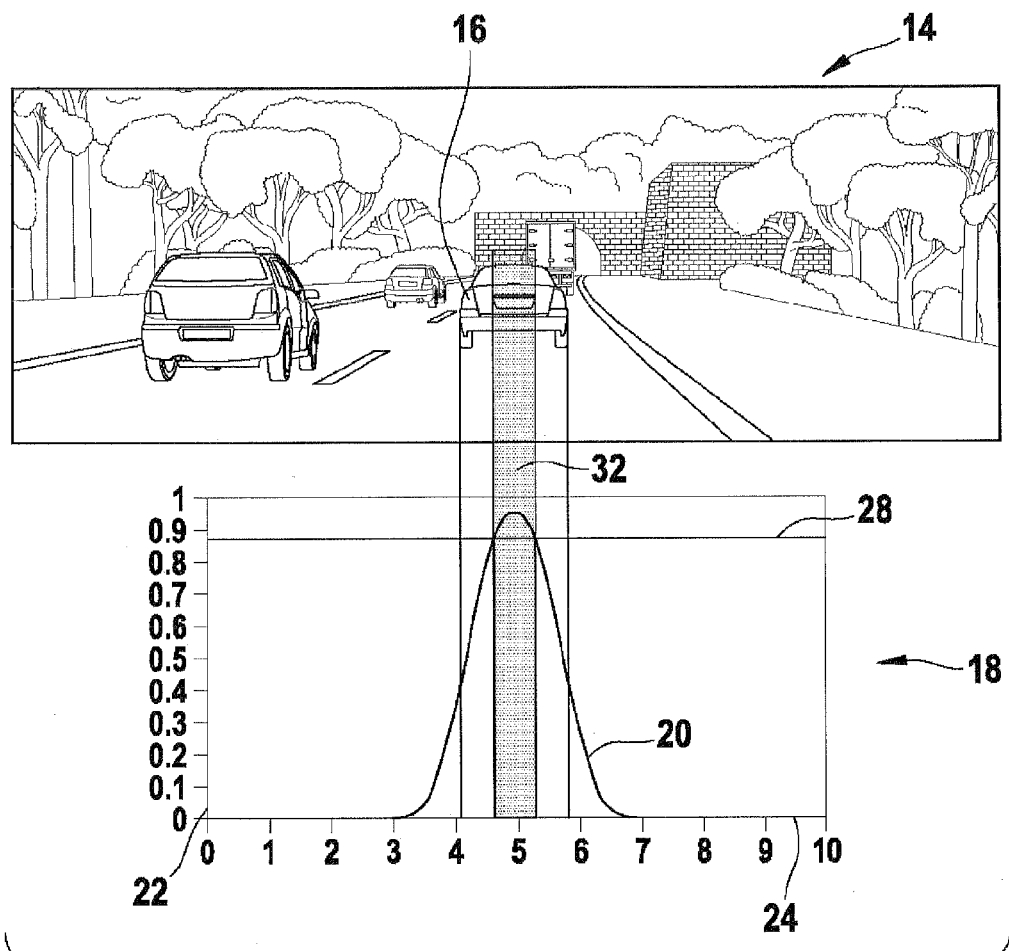

FIGS. 2a, 2b, 2c each show, at the top, a schematic depiction of an environment 14 which is a traffic situation. Environment 14 is detected using a sensor, by a vehicle which is not depicted. Within the scope of one possible embodiment of the method, a vehicle which is traveling directly ahead is observed in this case as object 16. Below each schematically depicted environment 14 in FIGS. 2a, 2b, 2c, a diagram 18 is shown that includes a function for a probability value 20. In diagrams 18, probability value 20 which has been normalized to 1 is plotted along vertical axis 22 against a horizontal axis 24 for a longitudinal expansion of object 16.

Diagram 18 in FIG. 2a also includes a first horizontal line 26 for a comfort function, and a second horizontal line 28 for a safety function.

For clarity, diagram 18 in FIG. 2b shows the curve for probability value 20 as well as first line 26 for the comfort function, for an active/adaptive cruise control (ACC) for distance control in this case. A first column 30 extends along a region of second axis 24, in which the probability value is greater than first line 26 for the comfort function, thereby depicting an intersection level of this comfort function. First column 30 indicates the region of environment 14 in which object 16 traveling ahead must be considered to be particularly relevant.

In diagram 18 in FIG. 2c, the curve for probability value 20 is shown, along with second line 28 for a safety function which is emergency braking in this case. A second column 32 is plotted in diagrams 18 in the region of an intersection level in which probability value 20 is greater than second line 28. Second column 32 indicates the region of environment 14 in which object 16 traveling ahead must be considered to be particularly relevant in terms of emergency braking.

Figure 3:
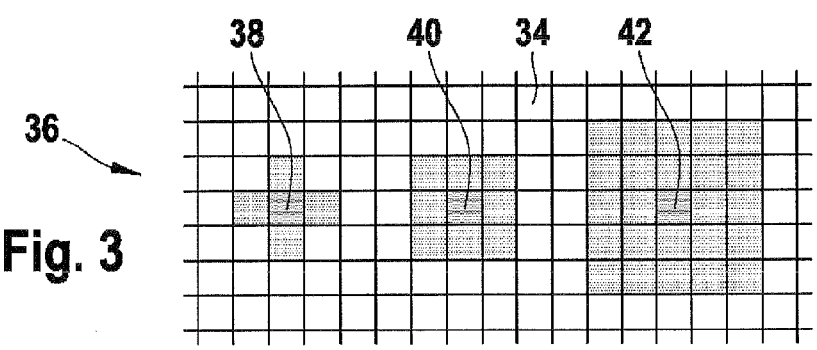
FIG. 3 shows examples of a segmenting, in a schematic depiction.

FIG. 3 shows, in a schematic depiction, a grid 36 which is composed of several cells 34. A first germ cell 38, a second germ cell 40, and a third germ cell 42 are shaded in dark gray in grid 36 to illustrate a segmenting that is carried out in one embodiment of the method according to the present invention. In the case of each of the three germ cells 38, 40, 42, a probability value and, therefore, a threshold criterium exceeds a threshold value. In a further embodiment of the method, cells 34 that are adjacent to germ cells 38, 40, 42 are investigated; they are shaded light gray in this case. Adjacent cells 34 are also investigated in terms of determining whether the threshold value criterium has been met. Adjacent cells 34 that are identified, and adjacent cells that meet the threshold value criterium are identified as being new germ cells. This process is repeated until all connected cells 34 that are adjacent to central germ cells 38, 40, 42 are found. Connected cells 34 are then allocated to a detected object. Adjacent cells 34 may then be investigated in a "neighborhood of four", in which case only cells 34 that are directly adjacent in the horizontal and vertical directions are taken into account for first germ cell 38. In a "neighborhood of eight" of second germ cell 40, cells 34 situated diagonally are considered in addition to cells 34 of the "neighborhood of four". Light gray-shaded, adjacent cells 34 of third germ cell 42 show an example of a "neighborhood of 24" in FIG. 3.

FIG. 4 through 9 each show a diagram 44 which includes a first axis 46, a second axis 48, and a third axis 49. Lateral expansions, i.e. expansions to the side, of −50 to +50 m are plotted on first axis 46. Longitudinal expansions, i.e. expansions that extend longitudinally, of 0 to 100 m are plotted on second axis 48. Probability values that have been normalized to 1 are plotted on third axis 50.

Figure 4:
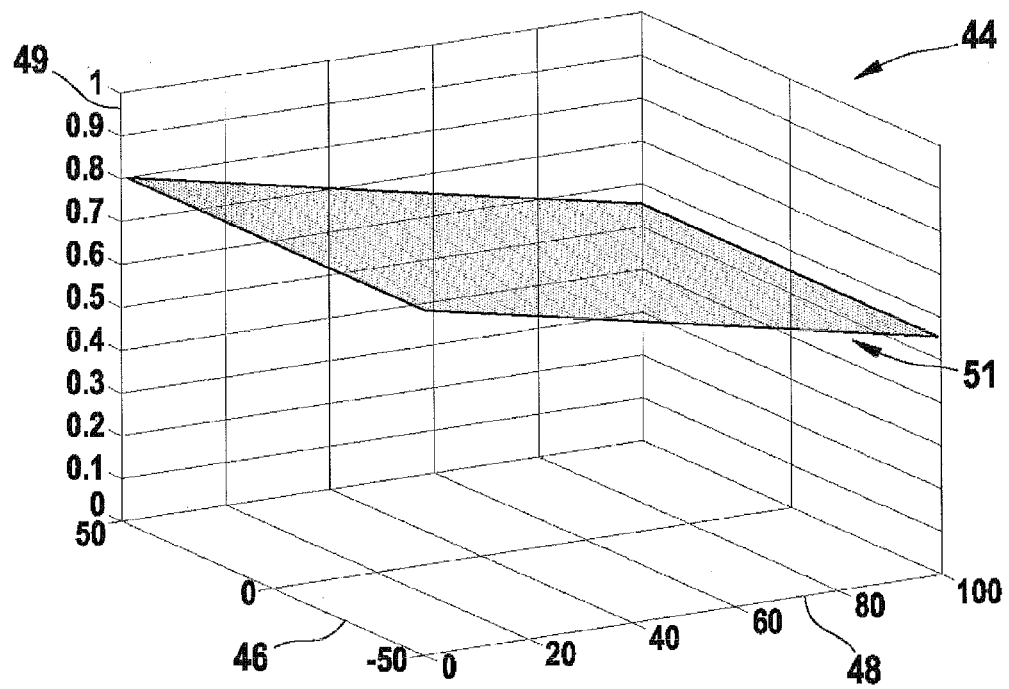
FIG. 4 shows an example of a distance-dependent segmenting threshold.

Diagram 18 in FIG. 4 shows an example of a segmenting threshold 51 that is dependent on distance.

Figure 5:
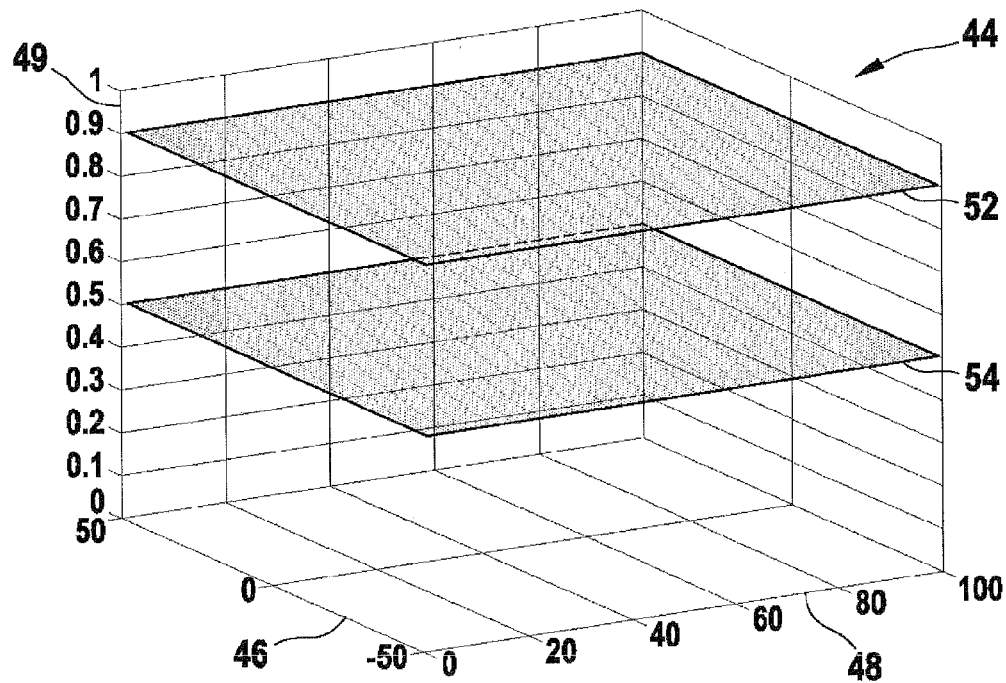
FIG. 5 shows an example of a function-dependent segmenting threshold.

Diagram 44 in FIG. 5 shows two examples of functionality-dependent segmenting thresholds 52, 54. First segmenting threshold 52 is provided for distance control. Second segmenting threshold 54 is used for a "PSS" function.

Figure 6:
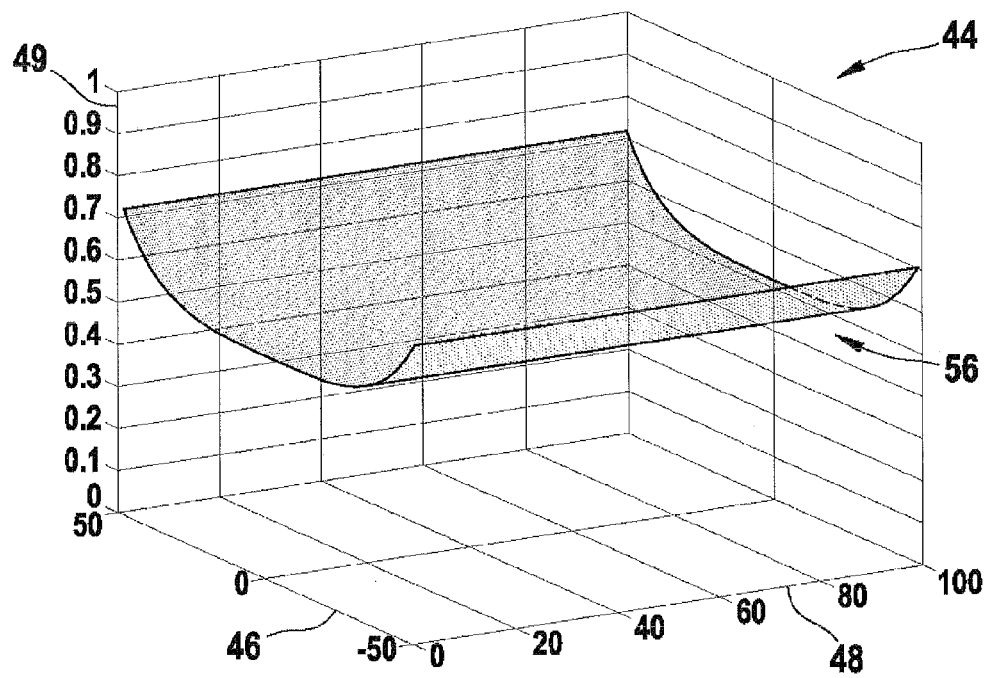
FIG. 6 shows an example of a segmenting threshold that increases laterally in a non-linear manner.

A first example of a non-linear segmenting threshold 56 is plotted in diagram 44 in FIG. 6. This non-linear segmenting threshold is largely constant along first axis 46 for minimal lateral expansions. For greater expansions, segmenting threshold 56 increases in a non-linear manner.

Figure 7:
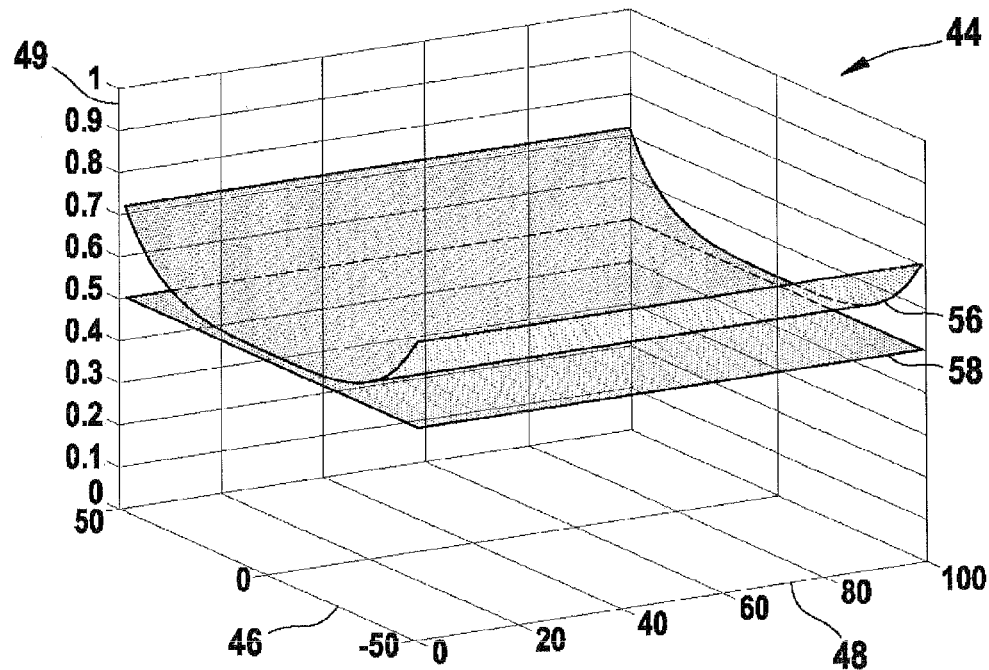
FIG. 7 shows a schematic depiction of the segmenting threshold in FIG. 6 in comparison with a constant segmenting threshold.

An increase of this type of non-linear segmenting threshold 56 is illustrated in diagram 44 in FIG. 7 via comparison with a constant segmenting threshold 58.

Figure 8:
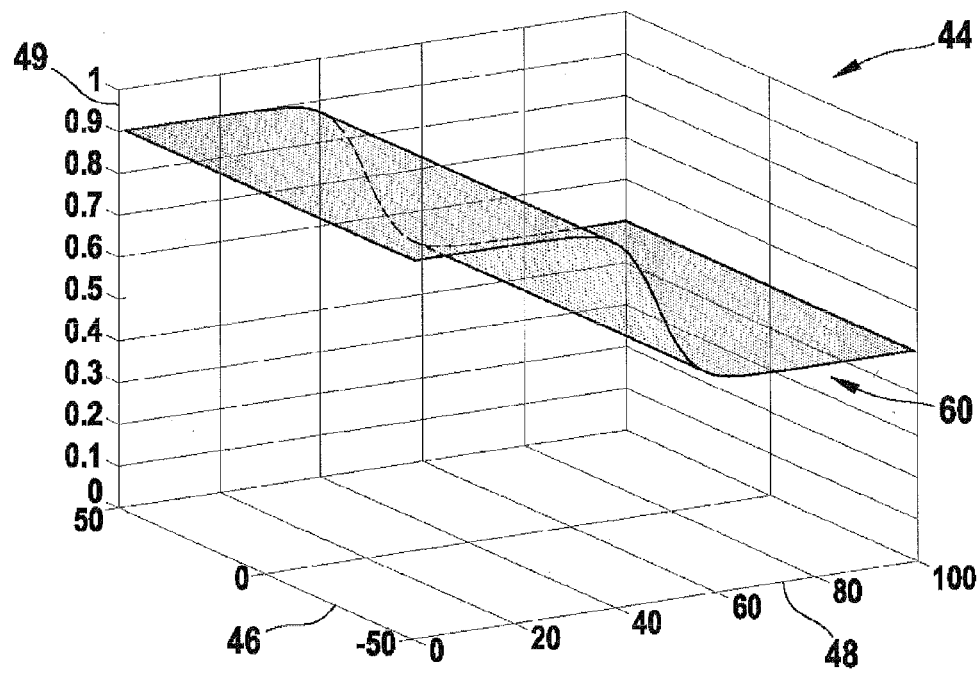
FIG. 8 shows a schematic depiction of an embodiment of a segmenting threshold that decreases longitudinally in a non-linear manner.

Diagram 44 in FIG. 8 shows a second example of a non-linear segmenting threshold 60. Non-linear segmenting threshold 60 is largely constant for close distances and for large distances. In a range for medium-range distances, values for non-linear segmenting threshold 60 decrease in a non-linear manner.

Figure 9:
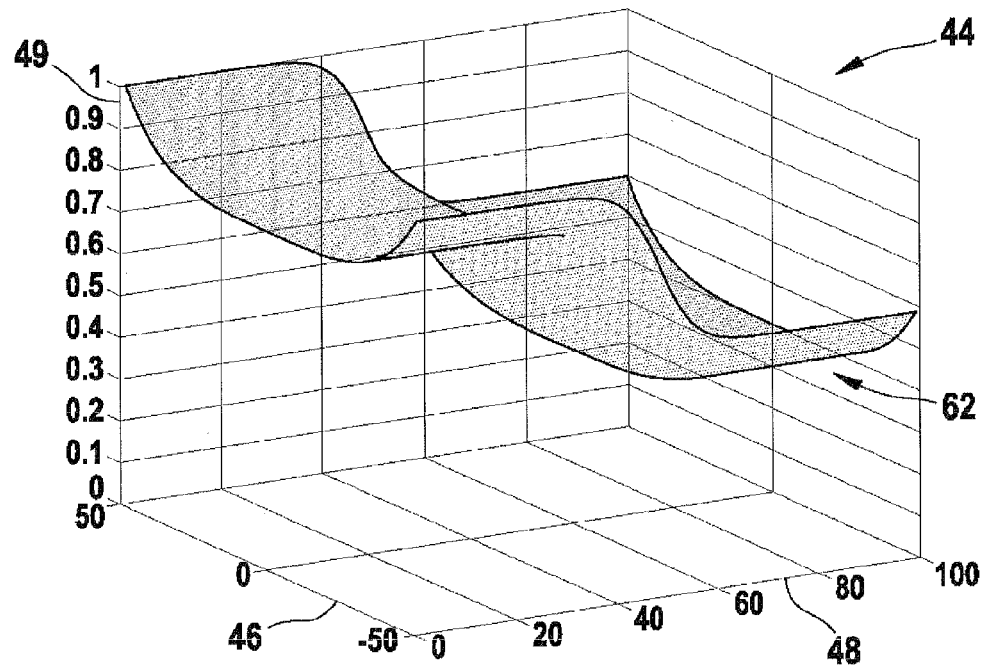
FIG. 9 shows a schematic depiction of an example of a combination of a segmenting threshold that decreases longitudinally in a non-linear manner, and a segmenting threshold that decreases laterally in a non-linear manner.

A third example of a non-linear segmenting threshold 62 is plotted in diagram 44 in FIG. 9. Non-linear segmenting threshold 62 includes a combination of a longitudinally non-linear segmenting threshold and a laterally non-linear segmenting threshold. This means that non-linear segmenting threshold 62 changes in a non-linear manner along first axis 46 for a lateral expansion, and along second axis 48 along the longitudinal expansion.

Figure 10:
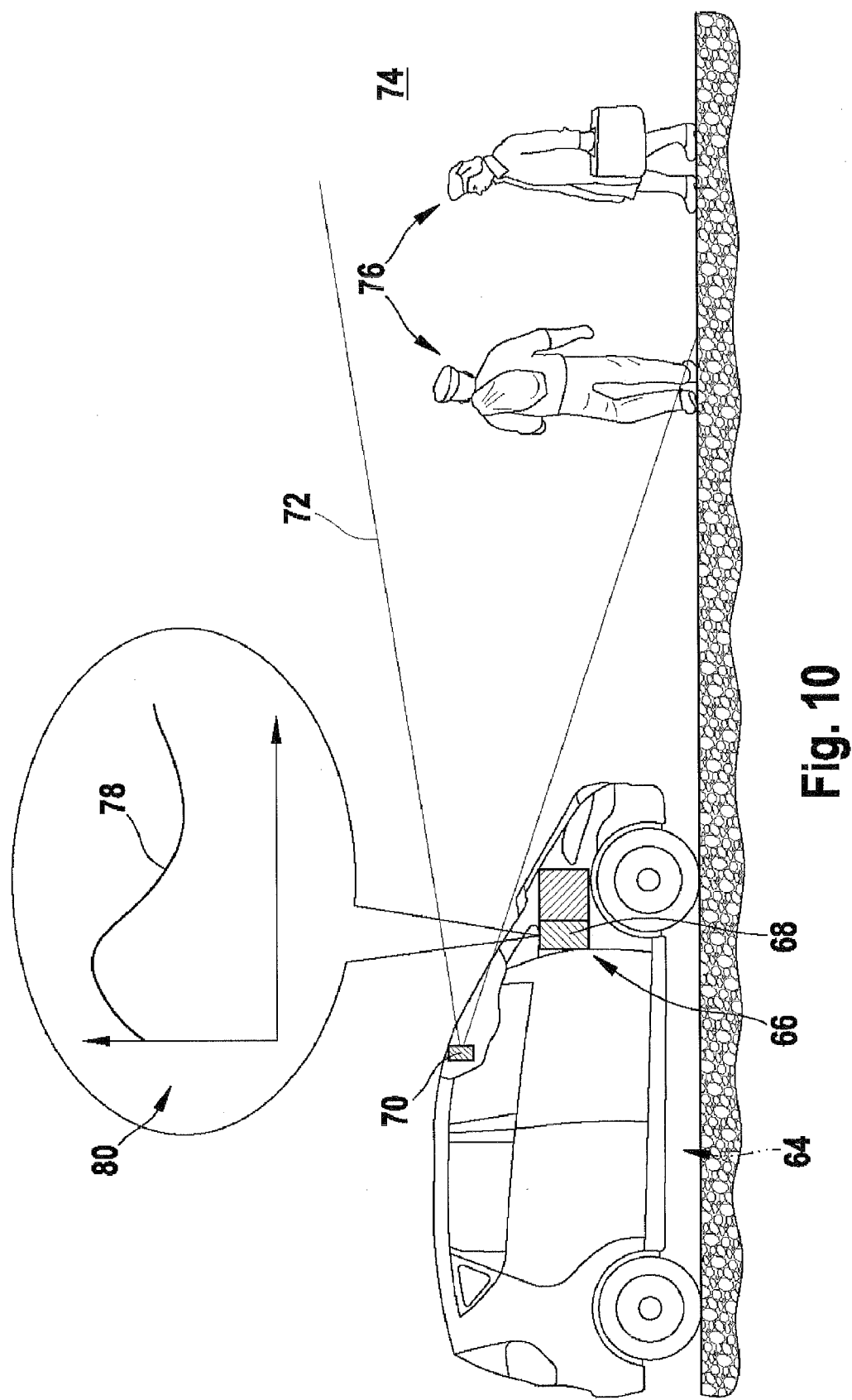
FIG. 10 shows a schematic illustration of an embodiment of a device according to the present invention in an application of an embodiment of the method according to the present invention.

FIG. 10 shows a schematic illustration of a vehicle 64 that includes an embodiment of a device 66 according to the present invention, with a module 68 and a sensor 70. Sensor 70 is designed to detect surroundings 74 of vehicle 64 within its detection range 72 which is bounded in this case by lines. Persons which are detected by sensor 70 as being objects 76 are situated within surroundings 74. During a detection procedure, sensor 70 provides measured results and, therefore, information regarding the surroundings. This information is processed by device 66. To handle this information, module 68 of device 66 is designed to perform this handling with consideration for a segmenting threshold 78 that is non-linear, at least in sections, and that is plotted in diagram 80.

What is claimed is:

1. A method for object formation for environmental modeling, the method comprising:
    processing information received from a sensor (70) with consideration for at least one non-linear segmenting threshold (56, 60, 62, 78); and
    implementing the at least one non-linear segmenting threshold (56, 60, 62, 78) in a functionally adaptive manner that includes a use of different intersection levels for any of different safety and comfort functions.

2. The method as recited in claim 1, in which the at least one non-linear segmenting threshold (56, 60, 62, 78) is implemented based on a characteristic curve.

3. The method as recited in claim 1, in which the at least one non-linear segmenting threshold (56, 60, 62, 78) is implemented in a manner such that it is adapted to the situation and is based on a model.

4. The method as recited in claim 1, in which the object formation is carried out in a manner based on a cell grid.

5. The method as recited in claim 1, wherein said processing information includes sensor signal processing.

6. The method as recited in claim 1, further comprising fusing sensor data.

7. The method as recited in claim 1, which is used for a driver assistance system.

8. A device for carrying out an object formation for environmental modeling, comprising:
    at least one module (68) designed to process information received from a sensor (70) with consideration for at least one non-linear segmenting threshold (56, 60, 62, 78);
    wherein the at least one non-linear segmenting threshold (56, 60, 62, 78) is implemented in a functionally adaptive manner that includes a use of different intersection levels for any of different safety and comfort functions.

9. A computer readable storage medium storing computer readable instructions than upon execution by a computer carrying out all steps of a method as recited in claim 1 when the computer program is run on a computer or a related arithmetic unit in a device (66).

10. A computer program product that includes program code means which are stored on a non-transitory computer-readable data storage device, which program code means are operable for implementing all steps of a method as recited in claim 1 when the computer program is run on a computer or a related arithmetic unit in a device (66).

* * * * *